United States Patent
Wang et al.

(10) Patent No.: US 12,086,316 B2
(45) Date of Patent: Sep. 10, 2024

(54) HAPTIC FEEDBACK DATA PROCESSING METHOD AND ELECTRONIC DEVICE

(71) Applicant: AAC Acousitc Technologies (Shanghai)Co., Ltd., Shanghai (CN)

(72) Inventors: Xiuyue Wang, Shenzhen (CN); Yulei Zhang, Shenzhen (CN); Xiaojie Shao, Shenzhen (CN)

(73) Assignee: AAC Acoustic Technologies (Shanghai)Co., Ltd., Shanghai (CN)

(*) Notice: Subject to any disclaimer, the term of this patent is extended or adjusted under 35 U.S.C. 154(b) by 227 days.

(21) Appl. No.: 17/566,686

(22) Filed: Dec. 31, 2021

(65) Prior Publication Data
US 2023/0161412 A1 May 25, 2023

(30) Foreign Application Priority Data
Nov. 23, 2021 (CN) .......................... 202111397327.3

(51) Int. Cl.
*G06F 3/01* (2006.01)
(52) U.S. Cl.
CPC .............. *G06F 3/016* (2013.01); *G06F 3/011* (2013.01)
(58) Field of Classification Search
CPC .......... G06F 3/016; G06F 3/011; G06F 16/41; G11B 20/10527; G11B 2020/10953
See application file for complete search history.

(56) References Cited

U.S. PATENT DOCUMENTS

2014/0205260 A1* 7/2014 Lacroix .................. G06F 3/016
386/201
2014/0347177 A1* 11/2014 Phan .................... A63F 13/285
340/407.1

FOREIGN PATENT DOCUMENTS

WO WO-2020041879 A1 * 3/2020 ............... G05G 5/03

* cited by examiner

*Primary Examiner* — Quan Zhen Wang
*Assistant Examiner* — Mancil Littlejohn, Jr.
(74) *Attorney, Agent, or Firm* — W&G Law Group

(57) ABSTRACT

The invention provides a haptic feedback data processing method. During the running of the preset application process, the haptic feedback data of the actuator is collected in real time. At the time of reference data sampling, all collected haptic feedback data are integrated and processed to generate recorded data. Store the executable data corresponding to the recorded data. Through the implementation of the present invention, the haptic feedback data generated in real time is recorded and stored during the running of the application. Therefore, in the application data playback scenario, the haptic feedback data during the running of the application can be output accordingly, which can provide users with a more extreme recording file playback experience.

7 Claims, 2 Drawing Sheets

HAPTIC FEEDBACK DATA PROCESSING METHOD AND ELECTRONIC DEVICE

FIELD OF THE PRESENT DISCLOSURE

The present invention relates to the technical field of electronic equipment, and in particular to a haptic feedback data processing method, and an electronic device performing the method.

DESCRIPTION OF RELATED ART

With the rapid development of technology today, various electronic terminals have been widely used in users' daily life and work. In order to improve the user experience, R&D personnel in various fields are also constantly seeking to improve product performance. Among them, tactile feedback, as a typical application on the terminal, is a factor that cannot be ignored in improving the user experience of the terminal.

Tactile is the most perceptive system of human body. It spreads across every inch of the skin of the user's body. It is with these tactile sensing cells that the user can clearly feel cold and heat, pain, swelling, caress or heavy pressure. Therefore, tactile feedback is highly interactive and can bring a variety of perception experiences to users.

At present, applications such as video, games, and music in terminal equipment are no longer limited to outputting auditory and visual feedback to users, and the application of tactile feedback is becoming more and more extensive. At present, the tactile feedback is only applied to real-time feedback during the running of the terminal application, and cannot meet the user's non-instant tactile feedback experience needs. For example, the user will record the exciting game fragments during the game running, so that after the game is over, they can recall the exciting moments of the game. However, the recording file usually only contains video data and audio data, and thus cannot provide tactile feedback to the user, resulting in a relatively limited playback experience of the recording file.

SUMMARY OF THE PRESENT INVENTION

The main purpose of the present invention is to provide a haptic feedback data processing method which can solve the problem that the recording file in the related technology usually only contains video data and audio data, and thus cannot provide the user with tactile feedback, resulting in a relatively limited playback experience of the recording file.

To achieve the above-mentioned objects, the present invention provides a haptic feedback data processing method, including steps of:
collecting haptic feedback data of an actuator in real time during running of a preset application process;
integrating and processing all the collected haptic feedback data for generating recorded data at the time of reference data sampling;
storing executable data corresponding to the recorded data.

In addition, at the time when the reference data is sampled, all the collected haptic feedback data are integrated and processed, and before the step of generating recorded data, the method further includes a step of collecting multimedia playback data in real time, wherein the multimedia playback data includes at least one of audio data, video data, and picture data;

at the time when the reference data is sampled, the step of integrating all the collected haptic feedback data to generate recorded data includes a step of:
at the time of reference data sampling, integrating all the collected multimedia playback data and haptic feedback data for generating the recorded data.

In addition, the step of storing executable data corresponding to the recorded data includes steps of:
storing original data stream corresponding to the recorded data directly;
or, converting the original data stream corresponding to the recorded data into abstract data in an abstract file format, wherein, the abstract file format includes at least one of HE format, AHAP format; and
storing the abstract data.

In addition, the haptic feedback data processing method as described above, before the step of collecting the haptic feedback data of the actuator in real time, further includes steps of:
obtaining a data quality requirement level corresponding to the recorded data;
determining a corresponding data sampling rate according to the data quality demand level; wherein
the step of collecting haptic feedback data of the actuator in real time includes a step of:
collecting the haptic feedback data of the actuator in real time according to the data sampling rate.

In addition, the haptic feedback data processing method as described above, after the step of storing the executable data corresponding to the recorded data, further includes steps of:
calling the executable data corresponding to the recorded data when a data play instruction is received;
controlling the actuator to output the haptic feedback data based on the executable data.

In addition, the executable data is an original data stream corresponding to the recorded data, and
the step of controlling the actuator to output the haptic feedback data based on the executable data includes steps of:
obtaining a valid playback data type supported by the play component;
directly controlling the actuator to output the haptic feedback data according to the original data stream if the valid playback data type is the original data stream;
converting the original data stream into the abstract data, and then controlling the actuator to output the haptic feedback data according to the abstract data if the valid playback data type is abstract data in an abstract file format.

In addition, the step of controlling the actuator to output the haptic feedback data based on the executable data includes steps of:
performing data enhancement processing on the executable data;
controlling the actuator to output the haptic feedback data according to the processed executable data.

The present invention further provides a haptic feedback data processing device, including:
a collection module, for collecting a haptic feedback data of an actuator in real time during running of a preset application process;
a processing module, for integrating all the collected haptic feedback data at the time of reference data sampling to generate recorded data;
a storage module, for storing the executable data corresponding to the recorded data.

The present invention further provides an electronic device, including:

a memory unit, a processor, and a computer program that is stored in the memory unit; wherein, when the processor executes the computer program, the steps in the method described above are implemented.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
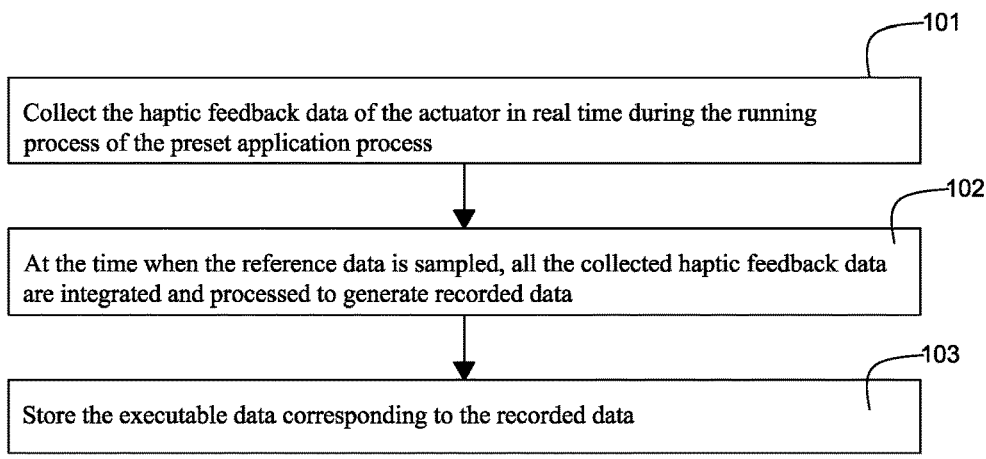
FIG. 1 is a schematic diagram of a basic flow of a haptic feedback data processing method provided by the first embodiment of the present invention.

In order to solve the problem that the recording file in the related technology usually only contains video data and audio data, and thus cannot provide tactile feedback to the user, the playback experience of the recording file is relatively limited. The first embodiment of the present invention provides a haptic feedback data processing method. FIG. 1 is a basic flowchart of the haptic feedback data processing method provided in this embodiment. The haptic feedback data processing method includes the following steps:

Step 101: Collect the haptic feedback data of the actuator in real time during the running process of the preset application process.

Specifically, the actuator of this embodiment is an electronic device that directly converts electrical energy into mechanical energy. The actuator vibrates to output tactile feedback to the end user. It should be noted that the application process in this embodiment can be video, game, music, etc. The actuator may preferably be a linear motor.

In practical applications, when the terminal equipment is running a specific application process, the actuator will vibrate in response to the triggering of the characteristic event during the running of the application process to output tactile feedback to the terminal user. Take a game application as an example. When a characteristic event such as a kill event, an upgrade event, or a special skill release event occurs during the game, the actuator generates vibration in response to the trigger of the characteristic event, and outputs the tactile feedback corresponding to each characteristic event. Strengthen the user's terminal experience.

It should also be noted that the haptic feedback data in this embodiment includes at least one of the following: Electric signal data, acceleration signal data, displacement data, momentum data. The data collection method can be realized through software collection or hardware collection. This embodiment does not make a unique limitation on this, and the specifics may depend on actual application scenarios.

In some implementations of this embodiment, before the step of collecting the haptic feedback data of the actuator in real time, it further includes: Obtain the data quality requirement level corresponding to the recorded data. Determine the corresponding data sampling rate according to the data quality demand level. Correspondingly, the steps of collecting the haptic feedback data of the actuator in real time above specifically include: According to the data sampling rate, collect the haptic feedback data of the actuator in real time.

Specifically, sampling rate is also called sampling speed or sampling frequency, which defines the number of samples extracted from a continuous signal per unit time to form a discrete signal. In layman's terms, sampling rate is the number of signal samples that need to be collected per unit time. In practical applications, the higher the sampling rate, the higher the degree of restoration of the original data from the collected data. Correspondingly, the occupation of processor and memory unit is greater. In this embodiment, in order to balance the terminal resource occupation and the data restoration effect, the data sampling rate can be adjusted adaptively according to the data quality requirements in the actual application scenario, and haptic feedback data can be collected accordingly. In this way, data details can be improved in the case of high data quality requirements. In the case of general data quality requirements, while ensuring basic quality requirements, it effectively reduces the complexity of data collection and data processing.

In some implementations of this embodiment, the foregoing step of collecting haptic feedback data of the actuator in real time specifically includes: Receive haptic feedback data collection instructions. According to the characteristic event type indicated by the haptic feedback data collection instruction, the haptic feedback data of the actuator is collected in real time.

Specifically, during the running of the application process, haptic feedback data can be triggered based on different types of characteristic events. In this embodiment, haptic feedback data triggered by a specific type of characteristic event can be correspondingly collected according to actual needs of the user. Improved the flexibility of haptic feedback data recording.

Step 102: At the time when the reference data is sampled, all the collected haptic feedback data are integrated and processed to generate recorded data.

Specifically, in this embodiment, multiple discrete haptic feedback data are obtained by sampling at different data sampling moments. By integrating all haptic feedback data reference data sampling moments, an overall recorded data of multiple haptic feedback data is formed.

In some implementations of this embodiment, at the above-mentioned reference data sampling time, all collected haptic feedback data are integrated and processed to generate recorded data. Specifically: All haptic feedback data are classified according to the characteristic event type associated with each haptic feedback data. At the time of reference data sampling, all haptic feedback data of each type are integrated and processed to generate multiple recorded data.

Specifically, as mentioned above, the tactile feedback is triggered based on the characteristic event, and the characteristic event has many types in practical applications. Tactile feedback of different characteristic events has different requirements for user experience. In this embodiment, haptic feedback data is classified according to the characteristic event type, so that the tactile feedback recorded data of a single event can be generated. In this way, when the user recalls the haptic feedback data, he can have a targeted experience of the haptic feedback data triggered by a specific event.

In some implementations of this embodiment, at the time when the reference data is sampled, all the collected haptic feedback data are integrated. Before generating recorded data, it also includes: Collect multimedia playback data in real time. Wherein, multimedia playback data includes at least one of the following: audio data, video data, picture data. Correspondingly, at the above-mentioned reference data sampling time, all the collected haptic feedback data are integrated and processed to generate recorded data. Specifically: At the time of reference data sampling, all the collected multimedia playback data and haptic feedback data are integrated and processed to generate recorded data.

Specifically, during the running of the application process (including but not limited to tactile games), tactile feedback and auditory feedback and visual feedback usually work together. Therefore, in this embodiment, while collecting haptic feedback data, it is also possible to synchronously collect multimedia playback data, such as audio data, video data, and so on. Moreover, when haptic feedback data is recorded, haptic feedback data and multimedia playback data are combined to record, and the diversity and comprehensiveness of recorded data are improved. It should be understood that in this embodiment, when multiple types of data are integrated, the data integration is performed at the time of reference data sampling, so that the time consistency of the multiple types of data can be ensured.

Step 103: Store the executable data corresponding to the recorded data.

Specifically, in this embodiment, after the recording of the haptic feedback data is completed, the executable data corresponding to the recorded data is further stored for subsequent recall. It should be understood that the executable data in this embodiment is data that can be executed by the actuator. In addition, it can also generate executable data corresponding play time axis data for all data collection moments. And while storing executable data, it also stores the playback time axis data.

It should be noted that the specific implementation of the steps of storing the executable data corresponding to the recorded data in this embodiment includes, but is not limited to, the following two:

The first way is to directly store the original data stream corresponding to the recorded data.

The second method is to convert the original data stream corresponding to the recorded data into abstract data in the abstract file format. Store abstract data.

Specifically, the original data stream refers to a data format that can be directly executed, which can realize distortion-free playback and ensure data details to the greatest extent. The abstract file format is based on the original data stream conversion, and some data details will be lost during the data conversion process. Data execution efficiency is high, and it takes up less space. The abstract file format in this embodiment includes at least one of the following: HE format, AHAP format.

In some implementations of this embodiment, after the step of storing the executable data corresponding to the recorded data, the method further includes: When receiving the data play instruction, call the executable data corresponding to the recorded data. Control the actuator to output haptic feedback data based on executable data.

Specifically, in related technologies, currently, only recording and saving of audio and video data, etc. are supported, and an effective recording and saving method for haptic feedback data has not been provided. It cannot meet the needs of users for repeated experience, collection, sharing, and recall of tactile feedback. Based on the implementation basis of the aforementioned haptic feedback data recording in this embodiment, this embodiment calls executable data to drive the actuator to execute corresponding tactile feedback when receiving a data playback instruction input by the user, thereby realizing the reproduction of historical tactile perception effects.

In some implementations of this embodiment, the aforementioned executable data is an original data stream corresponding to recorded data. Correspondingly, the steps of controlling the actuator to output haptic feedback data based on executable data include: Get the valid playback data type supported by the play component. If the valid playback data type is an original data stream, the actuator will directly output haptic feedback data according to the original data stream. If the valid playback data type is abstract data in abstract file format, the original data stream is converted to abstract data. Then follow the abstract data to control the actuator to output haptic feedback data.

Specifically, in actual applications, the data playback types supported by different types of terminal equipment may be different. In this embodiment, the stored executable data is an original data stream. If the play component supports the original data stream playback function, the original data stream is directly called to drive the actuator to realize lossless playback. If the play component does not support the original data stream playback function, it can be converted to abstract data, and then the actuator can be driven by the abstract data. Of course, in other implementations, different types of executable data can be stored, so that the corresponding type of executable data can be called for playback during data playback.

It should be noted that some data will be lost when the original data stream is converted to abstract data. In this embodiment, the valid playback data type supported by the play component can be obtained in advance. If the valid playback data type is abstract data, refer to the first sampling rate to collect the haptic feedback data of the actuator in real time. The first sampling rate is higher than the second sampling rate corresponding to the original data stream to improve the data details of the original data stream, compensate for the loss of data details during the data conversion process, and maximize the fidelity of the abstract data during playback. If the valid playback data type is an original data stream, refer to the second sampling rate to collect the haptic feedback data of the actuator in real time. Reduce the sampling rate when the data details are sufficient to reduce the occupation of system resources in the data processing process.

In some implementations of this embodiment, the foregoing step of controlling the actuator to output haptic feedback data based on executable data includes: Perform data enhancement processing on executable data. According to the processed executable data, control the actuator to output haptic feedback data.

Specifically, in this embodiment, on the basis of the strength of the original tactile feedback, the executable data corresponding to the original haptic feedback data is enhanced. For example, increase the data amplitude and realize the enhancement of haptic feedback data. Achieve ultra-limit playback effects, and bring users a more extreme tactile effect experience.

Compared with related technologies, the haptic feedback data processing method provided in this embodiment collects the haptic feedback data of the actuator in real time during the running process of the preset application process. At the time of reference data sampling, all collected haptic feedback data are integrated and processed to generate recorded data. Store the executable data corresponding to the recorded data. Through the implementation of the present invention, the haptic feedback data generated in real time is recorded and stored during the running of the application. Therefore, in the application data playback scenario, the haptic feedback data during application operation can be output accordingly, which can provide users with a more extreme recording file playback experience.

Figure 2:
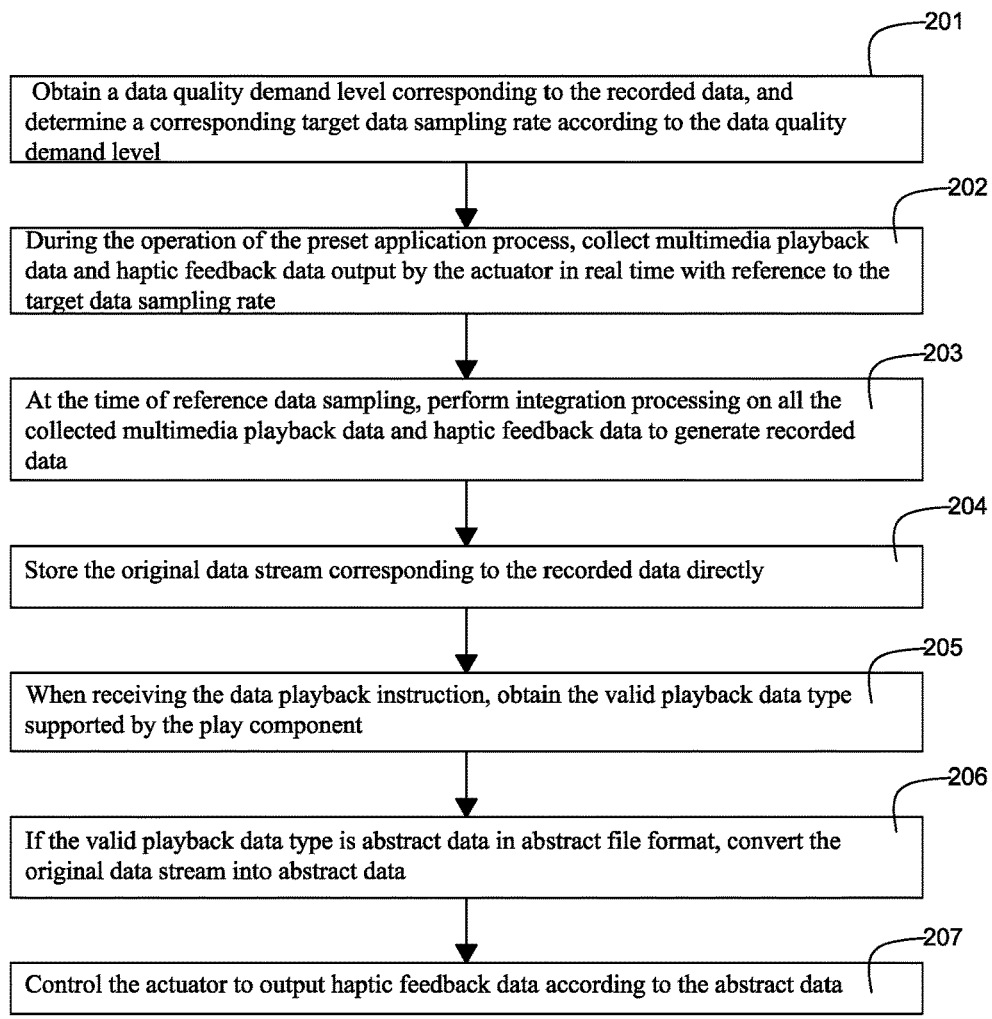
FIG. 2 is a detailed flowchart of a haptic feedback data processing method provided by the second embodiment of the present invention.

In order to better understand the present invention, embodiments of the present invention also provide a refined haptic feedback data processing method. The method in FIG. 2 is a refined haptic feedback data processing method provided by the second embodiment of the present invention. The haptic feedback data processing method includes:

Step 201: Obtain a data quality demand level corresponding to the recorded data, and determine a corresponding target data sampling rate according to the data quality demand level.

In this embodiment, the data sampling rate is adaptively adjusted according to the data quality requirements in the actual application scenario, so as to improve the data details by adopting a high sampling rate in the case of high data quality requirements. In the case of general data quality requirements, a relatively low sampling rate is adopted to effectively reduce the complexity of data collection and data processing while ensuring basic quality requirements.

Step 202: During the operation of the preset application process, collect multimedia playback data and haptic feedback data output by the actuator in real time with reference to the target data sampling rate.

In this embodiment, multimedia playback data includes at least one of the following: audio data, video data, picture data. The application process can be video, game, music, etc. The actuator can preferably be a linear motor.

Step 203: At the time of reference data sampling, perform integration processing on all the collected multimedia playback data and haptic feedback data to generate recorded data.

Specifically, in this embodiment, when haptic feedback data is recorded, haptic feedback data and multimedia playback data are combined and recorded. Improve the diversity and comprehensiveness of recorded data. It should be understood that in this embodiment, when multiple types of data are integrated, the data integration is performed at the time of reference data sampling. Thus, the time consistency of multiple types of data can be guaranteed.

Step 204: Store the original data stream corresponding to the recorded data directly.

Specifically, in this embodiment, the original data stream refers to a data format that can be directly executed, which can realize distortion-free playback and ensure data details to the greatest extent.

Step 205: When receiving the data playback instruction, obtain the valid playback data type supported by the play component.

Step 206: If the valid playback data type is abstract data in abstract file format, convert the original data stream into abstract data.

In this embodiment, the abstract file format can be converted based on the original data stream, and some data details will be lost during the data conversion process. But its data execution efficiency is high, and it takes up less space.

Step 207: Control the actuator to output haptic feedback data according to the abstract data.

Specifically, this embodiment calls executable data to drive the actuator to execute corresponding tactile feedback when receiving the data playback instruction input by the user, thereby realizing the reproduction of historical tactile perception effects.

Compared with the related technology, this embodiment synchronously records and stores haptic feedback data and multimedia playback data generated in real time during the running of the application. Therefore, in the application data playback scenario, the haptic feedback data during the running of the application can be output accordingly, which can provide users with a more extreme recording file playback experience.

Figure 3:
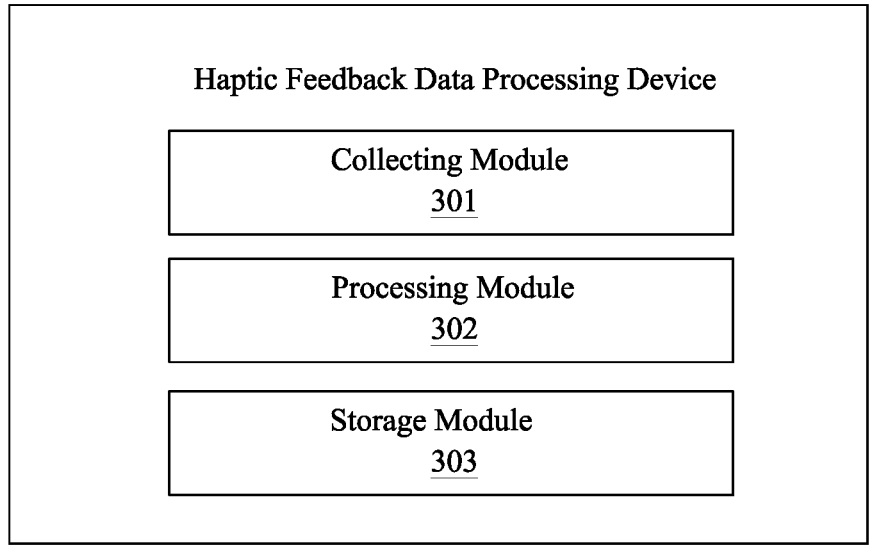
FIG. 3 is a schematic diagram of a program module of a haptic feedback data processing device provided by a third embodiment of the present invention.

FIG. 3 is a haptic feedback data processing device provided by the third embodiment of the present invention. The haptic feedback data processing device can be used to implement the haptic feedback data processing method in the foregoing embodiment. As shown in FIG. 3, the haptic feedback data processing device mainly includes:
- a collecting module 301, used to collect the haptic feedback data of the actuator in real time during the running of the preset application process.
- a processing module 302, used to integrate all the collected haptic feedback data at the time of reference data sampling to generate recorded data.
- a storage module 303, used to store the executable data corresponding to the recorded data.

In an optional implementation manner of this embodiment, the collection module is also used to: Collect multimedia playback data in real time. Wherein, multimedia playback data includes at least one of the following: audio data, video data, picture data. Correspondingly, the processing module is specifically used for: At the time of reference data sampling, all the collected multimedia playback data and haptic feedback data are integrated and processed to generate recorded data.

In an optional implementation manner of this embodiment, the storage module is specifically used for: Store the original data stream corresponding to the recorded data directly. Or, convert the original data stream corresponding to the recorded data into abstract data in the abstract file format. Among them, the abstract file format includes at least one of the following: HE format, AHAP format. Store abstract data.

In an optional implementation manner of this embodiment, the haptic feedback data processing device further includes: Determine the module to obtain the data quality requirement level corresponding to the recorded data. Determine the corresponding data sampling rate according to the data quality demand level. Correspondingly, the collection module is specifically used for: According to the data sampling rate, the haptic feedback data of the actuator is collected in real time.

In an optional implementation manner of this embodiment, the haptic feedback data processing device further includes: The output module is used to call the executable data corresponding to the recorded data when the data playback instruction is received. Control the actuator to output haptic feedback data based on executable data.

Further, in an optional implementation manner of this embodiment, the executable data is an original data stream corresponding to the recorded data. Correspondingly, when the output module executes the above-mentioned function of controlling actuator output haptic feedback data based on executable data, it is specifically used to: Get the valid playback data type supported by the play component. If the valid playback data type is an original data stream, the actuator will directly output haptic feedback data according to the original data stream. If the valid playback data type is abstract data in abstract file format, convert the original data stream to abstract data, and then control the actuator to output haptic feedback data according to the abstract data.

Further, in another optional implementation manner of this embodiment, the output module is specifically used to: Perform data enhancement processing on executable data. According to the processed executable data, control the actuator to output haptic feedback data.

It should be noted that the haptic feedback data processing methods in the first and second embodiments can be implemented based on the haptic feedback data processing device provided in this embodiment. Those of ordinary skill in the art can clearly understand that for the convenience and conciseness of description, the specific working process of the haptic feedback data processing device described in this embodiment can refer to the corresponding process in the foregoing method embodiment.

Compared with the related technology, the haptic feedback data processing device provided in this embodiment collects the haptic feedback data of the actuator in real time during the running process of the preset application process. At the time of reference data sampling, all collected haptic feedback data are integrated and processed to generate recorded data. Store the executable data corresponding to the recorded data. Through the implementation of the present invention, the haptic feedback data generated in real time is recorded and stored during the running of the application. Therefore, in the application data playback scenario, the haptic feedback data during the running of the application can be output accordingly, which can provide users with a more extreme recording file playback experience.

Figure 4:
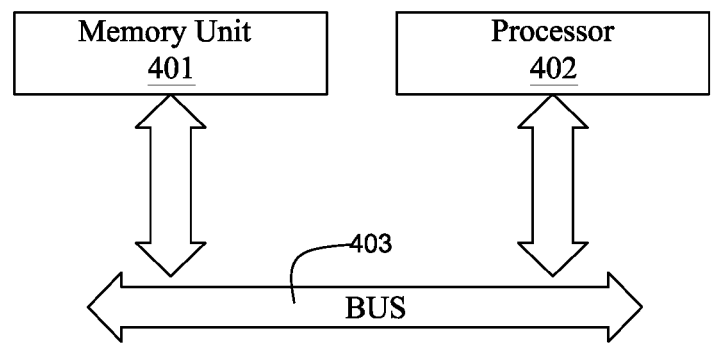
FIG. 4 is a schematic structural diagram of a device provided by a fourth embodiment of the present invention.

Please refer to FIG. 4, which is a terminal equipment provided by a fourth embodiment of the present invention. The terminal equipment can be used to implement the haptic feedback data processing method in the foregoing embodiment. As shown in FIG. 4, the terminal equipment mainly includes:

a memory unit 401, a processor 402, a bus 403, and a computer program stored on memory unit 401 and running on processor 402. The memory unit 401 and the processor 402 are connected via bus 403. When the processor 402 executes the computer program, it implements the haptic feedback data processing method in the foregoing embodiment. Among them, the number of processors can be one or more.

The memory unit 401 may be a high-speed random access memory (RAM, Random Access Memory) memory unit, or a non-volatile memory unit (non-volatile memory), such as a disk memory unit. The memory unit 401 is used to store executable program codes, and the processor 402 is coupled with the memory unit 401.

Further, an embodiment of the present invention also provides a computer-readable storage medium, the computer-readable storage medium may be set in the terminal equipment in each of the foregoing embodiments, and the computer-readable storage medium may be the one shown in FIG. 4 above. The memory unit in the embodiment is shown.

A computer program is stored on the computer-readable storage medium, and when the program is executed by the processor, the haptic feedback data processing method in the foregoing embodiment is implemented. Further, the storage medium of the computer may also be a U disk, a mobile hard disk, a read-only memory unit (ROM, Read-Only Memory), a RAM, a magnetic disk, or an optical disk and other various media that can store program codes.

In the several embodiments provided by the present invention, it should be understood that the disclosed device and method can be implemented in other ways. For example, the device embodiments described above are merely illustrative. For example, the division of modules is only a logical function division, and there can be other divisions in actual implementation. For example, multiple modules or components can be combined or integrated into another system, or some features can be ignored or not implemented. On the other hand, the displayed or discussed mutual coupling or direct coupling or communication connection may be indirect coupling or communication connection through some interfaces, devices or modules. It can be electrical, mechanical or other forms.

A module described as a separate component may or may not be physically separate, and a component displayed as a module may or may not be a physical module, that is, it may be located in one place, or it may be distributed to multiple network modules. Some or all of the modules can be selected according to actual needs to achieve the purpose of the solution of this embodiment.

In addition, the functional modules in the various embodiments of the present invention may be integrated into one processing module, or each module may exist alone physically, or two or more modules may be integrated into one module. The above-mentioned integrated module can be implemented in the form of hardware or software function module.

If the integrated module is implemented in the form of a software function module and sold or used as an independent product, it can be stored in a computer readable storage medium. Based on this understanding, the technical solution of the present invention can be embodied in the form of a software product in essence or a part that contributes to the existing technology, or all or part of the technical solution. The computer software product is stored in a readable storage medium, and includes a number of instructions to make a computer device (which may be a personal computer, a server, or a network device, etc.) execute all or part of the steps of the methods in the various embodiments of the present invention. The aforementioned readable storage medium includes: U disk, mobile hard disk, ROM, RAM, magnetic disk or optical disk and other media that can store program code.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A haptic feedback data processing method, including steps of:

collecting haptic feedback data of an actuator in real time during running of a preset application process;

integrating and processing all the collected haptic feedback data for generating recorded data at the time of reference data sampling;
storing executable data corresponding to the recorded data;
wherein the step of storing executable data corresponding to the recorded data includes steps of: converting the original data stream corresponding to the recorded data into abstract data in an abstract file format, wherein, the abstract file format includes at least one of HE format, AHAP format; and storing the abstract data;
wherein after the step of storing the executable data corresponding to the recorded data, further including steps of: calling the executable data corresponding to the recorded data when a data play instruction is received; controlling the actuator to output the haptic feedback data based on the executable data;
wherein the step of controlling the actuator to output the haptic feedback data based on the executable data includes steps of: performing data enhancement processing on the executable data; controlling the actuator to output the haptic feedback data according to the processed executable data.

2. The haptic feedback data processing method as described in claim 1, wherein, at the time when the reference data is sampled, all the collected haptic feedback data are integrated and processed, and before the step of generating recorded data, the method further includes a step of collecting multimedia playback data in real time, wherein the multimedia playback data includes at least one of audio data, video data, and picture data;
at the time when the reference data is sampled, the step of integrating all the collected haptic feedback data to generate recorded data includes a step of:
at the time of reference data sampling, integrating all the collected multimedia playback data and haptic feedback data for generating the recorded data.

3. The haptic feedback data processing method as described in claim 1, wherein the step of storing executable data corresponding to the recorded data includes steps of:
storing original data stream corresponding to the recorded data directly.

4. The haptic feedback data processing method as described in claim 1 before the step of collecting the haptic feedback data of the actuator in real time, further including steps of:
obtaining a data quality requirement level corresponding to the recorded data;
determining a corresponding data sampling rate according to the data quality demand level; wherein
the step of collecting haptic feedback data of the actuator in real time includes a step of:
collecting the haptic feedback data of the actuator in real time according to the data sampling rate.

5. The haptic feedback data processing method as described in claim 1, wherein the executable data is an original data stream corresponding to the recorded data, and
the step of controlling the actuator to output the haptic feedback data based on the executable data includes steps of:
obtaining a valid playback data type supported by the play component;
directly controlling the actuator to output the haptic feedback data according to the original data stream if the valid playback data type is the original data stream;
converting the original data stream into the abstract data, and then controlling the actuator to output the haptic feedback data according to the abstract data if the valid playback data type is abstract data in an abstract file format.

6. An electronic device, including:
a memory unit, a processor, and a computer program that is stored in the memory unit;
wherein, when the processor executes the computer program, the steps in the method described in claim 1 are implemented.

7. The haptic feedback data processing method as described in claim 1, wherein the step of controlling the actuator to output the haptic feedback data based on the executable data includes steps of:
increasing the data amplitude and realizing the enhancement of haptic feedback data.

* * * * *